United States Patent
Park

(10) Patent No.: US 12,328,470 B2
(45) Date of Patent: Jun. 10, 2025

(54) A/V RECEPTION DEVICE AND WIRELESS DISPLAY SYSTEM

(71) Applicant: LG ELECTRONICS INC., Seoul (KR)

(72) Inventor: Jungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/550,893

(22) PCT Filed: May 24, 2021

(86) PCT No.: PCT/KR2021/006460
§ 371 (c)(1),
(2) Date: Sep. 15, 2023

(87) PCT Pub. No.: WO2022/250174
PCT Pub. Date: Dec. 1, 2022

(65) Prior Publication Data
US 2024/0163507 A1 May 16, 2024

(51) Int. Cl.
*H04N 21/4363* (2011.01)
*H04L 12/18* (2006.01)

(52) U.S. Cl.
CPC ... *H04N 21/43637* (2013.01); *H04L 12/1868* (2013.01); *H04L 12/189* (2013.01)

(58) Field of Classification Search
CPC ....... H04N 21/43637; H04N 21/42607; H04N 21/433; H04N 21/43615; H04L 12/1868; H04L 12/189
See application file for complete search history.

(56) References Cited

U.S. PATENT DOCUMENTS

| 9,300,504 B2 | 3/2016 | Li et al. |
| 9,521,531 B2 | 12/2016 | Mese |
| 11,039,102 B1* | 6/2021 | Marcin ............ H04N 21/44209 |
| 2003/0079232 A1* | 4/2003 | Kirino .................... H04N 7/106 348/E7.051 |

(Continued)

FOREIGN PATENT DOCUMENTS

| EP | 1540866 | 3/2019 |
| JP | 2009-289291 | 12/2009 |

(Continued)

OTHER PUBLICATIONS

PCT International Application No. PCT/KR2021/006460, International Search Report dated Feb. 17, 2022, 4 pages.

(Continued)

*Primary Examiner* — Fernando Alcon
(74) *Attorney, Agent, or Firm* — LEE, HONG, DEGERMAN, KANG & WAIMEY

(57) ABSTRACT

An A/V (Audio/Video) receiving device according to an embodiment of the present disclosure may comprise: a display; a RF receiving module configured to receive a Radio Frequency (RF) packet from an A/V transmitting device; and a microcomputer configured to: when an abnormality occurs in an original RF signal included in the received RF packet, obtain a backup signal included in the RF packet and having the same identifier as the original RF signal, restore the obtained backup signal, and output the backup signal to the display.

15 Claims, 12 Drawing Sheets

(56) References Cited

U.S. PATENT DOCUMENTS

| | | | |
|---|---|---|---|
| 2003/0160781 A1* | 8/2003 | Berndt | G06T 11/206 |
| | | | 345/419 |
| 2004/0032853 A1 | 2/2004 | D'Amico et al. | |
| 2009/0024867 A1* | 1/2009 | Gloege | G06F 11/2007 |
| | | | 710/1 |
| 2011/0261751 A1* | 10/2011 | Ode | H04B 7/2606 |
| | | | 370/328 |
| 2012/0002103 A1 | 1/2012 | Shao et al. | |
| 2012/0224593 A1 | 9/2012 | Purohit | |
| 2017/0070772 A1* | 3/2017 | Nakamura | H04N 21/4425 |
| 2017/0111705 A1* | 4/2017 | Ma | H04N 21/4382 |
| 2019/0013902 A1* | 1/2019 | Seo | H04L 1/08 |
| 2020/0015227 A1* | 1/2020 | Yamada | H04W 76/40 |
| 2020/0092074 A1 | 3/2020 | Park et al. | |

FOREIGN PATENT DOCUMENTS

| | | |
|---|---|---|
| JP | 4523248 | 8/2010 |
| KR | 10-2010-0004907 | 1/2010 |
| KR | 10-1063410 | 9/2011 |
| KR | 10-2013-0136542 | 12/2013 |
| KR | 10-2020-0030795 | 3/2020 |

OTHER PUBLICATIONS

European Patent Office Application Serial No. 21943163.2, Search Report dated Feb. 4, 2025, 9 pages.

Cibuk et al., "Comparative Performance Analysis of Phase Division Multiplexing Techniques," European Journal of Technic (EJT), vol. 8., No. 2, Nov. 2018, 9 pages.

\* cited by examiner

FIG. 12

| original signal | 1 | 2 | 3 | 4 | 5 | 6 | 7 | 8 | 9 | 10 |
|---|---|---|---|---|---|---|---|---|---|---|
| phase-modulated signal | 1 | 1, 2 | 1, 2, 3 | 2, 3, 4 | 3, 4, 5 | 4, 5, 6 | 5, 6, 7 | 6, 7, 8 | 7, 8, 9 | 8, 9, 10 |
| output | 1 | 2 | 3 | 4 | 5 | 6 | 7 | 8 | 9 | 10 |

A/V RECEPTION DEVICE AND WIRELESS DISPLAY SYSTEM

CROSS-REFERENCE TO RELATED APPLICATION(S)

This application is the National Stage filing under 35 U.S.C. 371 of International Application No. PCT/KR2021/006460, filed on May 24, 2021, the contents of which is hereby incorporated by reference herein in its entirety.

TECHNICAL FIELD

The present disclosure relates to a wireless display system for wirelessly transmitting and receiving A/V data.

BACKGROUND ART

As image technology changes from analog to digital, development has been made from SD (Standard-Definition) to HD (Hi-Definition) to provide images closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (UHD) beyond Full HD. UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher picture quality than the HD.

Recently, a wireless display system that wirelessly transmits such a high-resolution image to a display device has emerged.

The wireless display system is a system for transmitting and receiving A/V data between an A/V transmitting device and an A/V receiving device through a local area network.

The A/V receiving device displays A/V data received from the A/V transmitting device.

In a wireless display system, sporadic loss of a transmitted signal is occurred when signal interference using the same band and signal distortion by an antenna occur are generated.

Cause of signal interference or signal loss include frequency interference of kitchen appliance such as microwave oven and interference with antenna reception by obstacle.

In addition, as the wireless connection of electronic device (ex, BT speaker) increases, the risk of signal interference is also in direct proportion.

Currently, since a video/audio is transmitted using an RF signal in a wireless display system, loss of a signal cannot be compensated for when a loss occurs.

Depending on the degree of signal loss, it causes an unpleasant experience to the user, ranging from deterioration of picture quality to freezing of the screen.

DISCLOSURE

Technical Problem

An object of the present disclosure is to provide a viewing experience without image deterioration in a situation where RF communication is poor in a wireless display system.

An object of the present disclosure is to secure reception stability when loss or interference of an RF signal occurs in a wireless display system.

An object of the present disclosure is to provide a seamless image by restoring a backup signal according to an abnormal type of an RF signal in a wireless display system.

Technical Solution

An A/V (Audio/Video) receiving device according to an embodiment of the present disclosure may comprise: a display; a RF receiving module configured to receive a Radio Frequency (RF) packet from an A/V transmitting device; and a microcomputer configured to: when an abnormality occurs in an original RF signal included in the received RF packet, obtain a backup signal included in the RF packet and having the same identifier as the original RF signal, restore the obtained backup signal, and output the backup signal to the display.

A wireless display system according to an embodiment of the present disclosure may comprise: an A/V (Audio/Video) transmitting device configured to: generate an RF packet and transmit the generated RF packet to an A/V receiving device through RF communication; and an A/V receiving device configured to: receive the RF packet from the A/V transmitting device, when an abnormality occurs in an original RF signal included in the received RF packet, obtain a backup signal included in the RF packet and having the same identifier as the original RF signal, restore the obtained backup signal, and output the backup signal.

Advantageous Effects

According to an embodiment of the present disclosure, even in a situation where RF communication is poor, the user can watch an uninterrupted video, and thus the stability of video viewing can be improved.

According to an embodiment of the present disclosure, regardless of RF signal loss or interference, the A/V receiving device can stably output an image.

DESCRIPTION OF DRAWINGS

FIG. 12 is a diagram for explaining a process of compensating for an original signal using a network packet when loss of an original signal occurs according to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specification meaning or function.

A video/audio (hereinafter, A/V) transmitting device according to an embodiment of the present disclosure is, for example, an intelligent device in which a computer support function is added to a broadcast reception function. The A/V transmitting device may perform the Internet function in addition to the broadcast reception function and may be equipped with a more user-friendly interface such as a handwritten input device, a touch screen or a spatial remote control device.

In addition, the A/V transmitting device may be connected to the Internet and a computer with the support of a wired or wireless Internet function and therefore, also perform functions such as e-mail, web browsing, banking, or games. A standardized general-purpose OS may be used for these various functions.

Accordingly, in the A/V transmitting device described in the present disclosure, for example, various applications may be freely added or deleted on a general-purpose OS kernel, so that various user-friendly functions may be performed.

Figure 1:
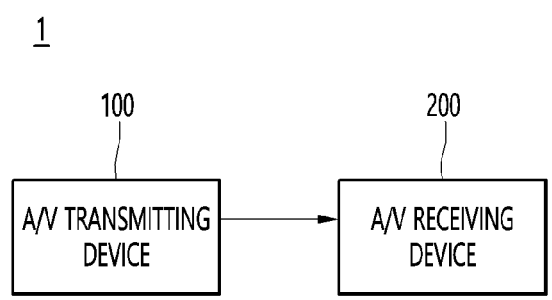
FIGS. 1 and 2 are diagrams for describing a configuration of a display system according to an embodiment of the present disclosure.
Figure 2:
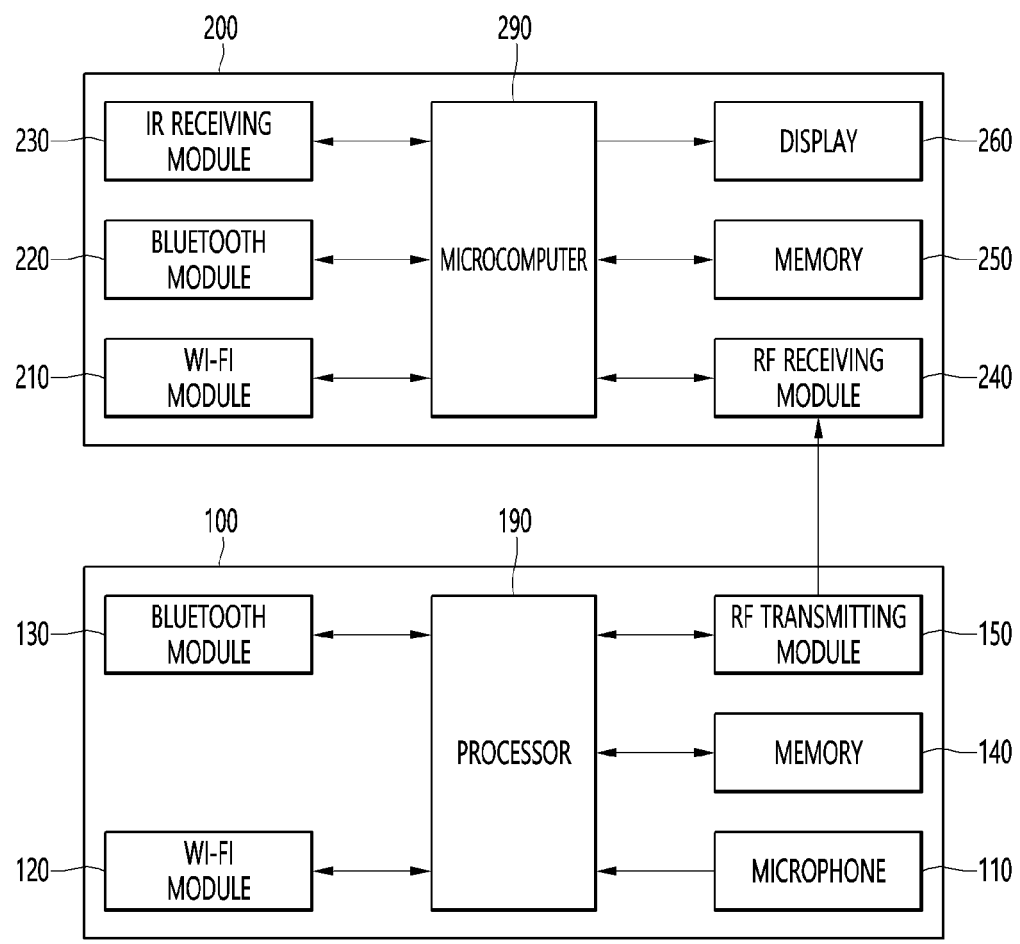

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding image and audio and transmitting the encoded content image and audio in a wireless manner.

The A/V transmitting device 100 may be a set-top box.

The A/V transmitting device 100 may be connected to an external device such as a set-top box or a USB memory. The A/V transmitting device 100 may transmit a image signal or an audio signal received from the connected external device to the A/V receiving device 200.

The A/V receiving device 200 may be a display device capable of wirelessly receiving an encoded image and audio and decoding the received image and audio.

The A/V transmitting device 100 and the A/V receiving device 200 may constitute a image wall display system.

In a image wall, a display having a thin bezel plays an important role in the visualization of content images. For a thin bezel of a display, it is efficient that components capable of minimal functions are only provided and a circuit or a component for a main function is provided in a separate device.

The A/V transmitting device 100 may determine a type of the content image input from the outside and determine a compression radio of the content image based on the determined type. The compression ratio of the content image may be defined as a ratio between the size of image data before encoding and the size of image data after encoding.

The type of the content image may include a still image type, a general image type, and a game image type.

The A/V transmitting device 100 may compress the content image according to the determined compression ratio, and wirelessly transmit the compressed content image to the A/V receiving device 200.

The A/V receiving device 200 may restore the compressed content image received from the A/V transmitting device 100 and display the restored content image on the display.

FIG. 2 is a block diagram illustrating detailed configurations of the A/V transmitting device 100 and the A/V receiving device 200.

Referring to FIG. 2, the A/V transmitting device 100 may include a microphone 110, a Wi-Fi module 120, a Bluetooth module 130, a memory 140, an RF transmitting module 150 and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Wi-Fi module 120 may perform wireless communication with an external device or the A/V receiving device 200 through the Wi-Fi standard.

The Bluetooth module 130 may perform wireless communication through a Bluetooth Low Energy (BLE) standard.

The Bluetooth module 130 may perform wireless communication with an external device such as a remote control device or the A/V receiving device 200 through a Bluetooth Low Energy (BLE) standard.

The memory 140 may store a program for signal processing and control and store a signal-processed image, audio, or data signal.

The memory 140 may perform a function for temporarily storing image, audio, or data signals input from the outside, and store information on a predetermined image through a channel storage function.

The RF transmitting module 150 may transmit an A/V signal to the RF receiving module 240 of the A/V receiving device 200 through radio frequency (RF) communication.

The RF transmitting module 150 may include one or more antennas.

The RF transmitting module 150 may transmit a compressed A/V signal in a digital form to the RF receiving module 240.

The RF transmitting module 150 may transmit an A/V signal to the RF receiving module 240 through one or more channels.

The processor 190 may control overall operation of the A/V transmitting device 100. The processor 110 may be configured in the form of a system on chip (SoC).

A plurality of processors 190 may be provided.

The processor 190 may compress a image signal or an audio signal input from the outside, and transmit the compressed signal to the RF transmitting module 150.

The processor 190 may include an encoder for compressing a image signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving device 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmitting device 100 through a Wi-Fi standard.

The Bluetooth module 130 may perform wireless communication through a Bluetooth Low Energy (BLE) standard.

The Bluetooth module 130 may perform wireless communication with an external device such as a remote control device or the A/V transmitting device 100 through a Bluetooth Low Energy (BLE) standard.

The IR module 230 may receive a signal from the remote control device 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed image, audio, or data signal.

The display 260 may display a image signal received from the microcomputer 290.

The display 260 may display the image signal according to driving of a timing controller (not shown).

The microcomputer 290 may control the overall operation of the A/V receiving device 200.

The microcomputer 290 may restore the compressed A/V signal received by the RF receiving module 240. To this end, the microcomputer 290 may include a decoder.

Figure 3:
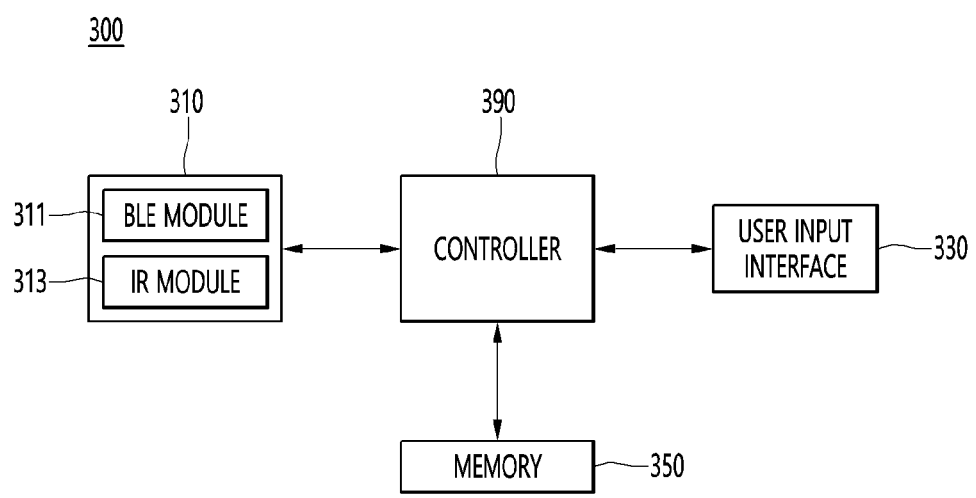
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an IR (Infra-Red) module 313.

The BLE module 311 may transmit a signal for controlling the operation of the A/V transmitting device 100 to the A/V transmitting device 100.

The BLE module 311 may transmit a signal for triggering a pairing operation of the A/V transmitting device 100 to the A/V transmitting device 100.

The user input interface 330 may include a keypad, a button, a touch pad, a touch screen, or the like.

The user input interface 330 may generate a control command for controlling the operation of the A/V transmitting device 100 or the A/V receiving device 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
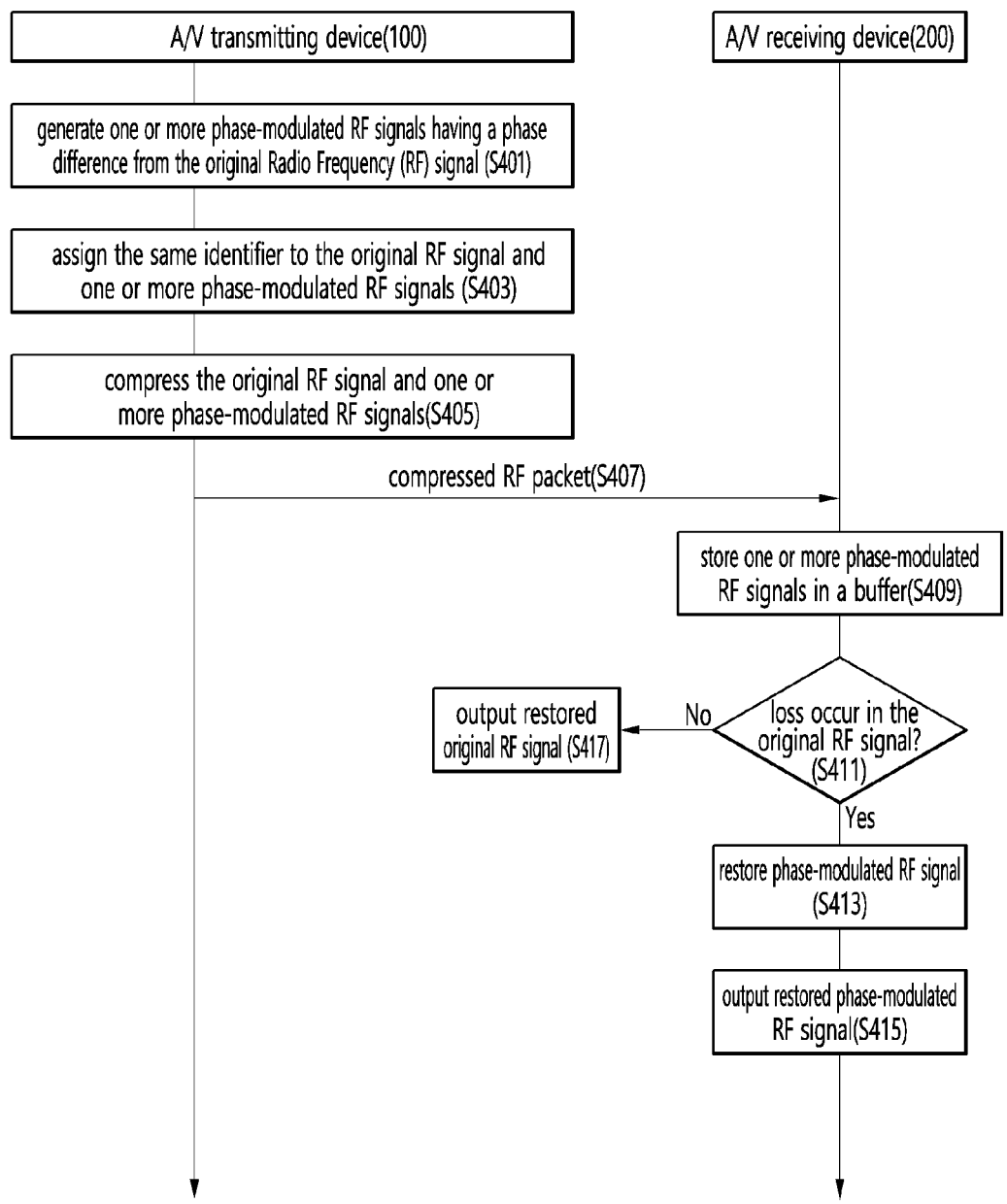
FIG. 4 is a ladder diagram for explaining a method of operating a wireless display system according to an embodiment of the present disclosure.

FIG. 4 is a ladder diagram for explaining a method of operating a wireless display system according to an embodiment of the present disclosure.

The processor 190 of the A/V transmitting device 100 generates one or more phase-modulated RF signals having a phase difference from the original Radio Frequency (RF) signal (S401).

The processor 190 may generate and transmit an additional phase modulated RF signal in preparation for loss of the original RF signal.

That is, when two identical RF signals having a time difference in the same band are received by the A/V receiving device 200, even if one of the two signals is lost, the RF signal can be restored through the remaining signal.

The original RF signal may be either a video signal or an audio signal. In this embodiment, a video signal is assumed and described.

An RF signal may have a sinusoidal waveform in its characteristic.

The sine wave is repeated at regular interval, and when signal transmission timing is adjusted, a plurality of signals can be transmitted through a plurality of communication channels without additional hardware.

Processor 190 may generate one or more phase modulated RF signals identical to the original RF signal, but with a 90 degree phase difference.

For example, the processor 190 may generate a phase-modulated RF signal having a phase difference of 90 degree, 180 degree, or 270 degree from the original RF signal.

Figure 5:
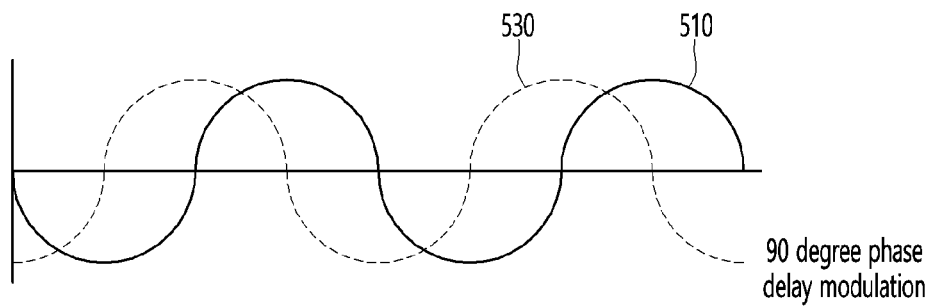
FIG. 5 is a diagram illustrating a phase-modulated RF signal whose phase is modulated from an original RF signal according to an embodiment of the present disclosure.

FIG. 5 is a diagram illustrating a phase-modulated RF signal whose phase is modulated from an original RF signal according to an embodiment of the present disclosure.

Referring to FIG. 5, an original RF signal 510 in the form of a sinusoidal wave is shown. The processor 190 may generate a phase modulated RF signal 530 that is delayed by 90 degrees from the original RF signal 510.

The processor 190 may generate a phase-modulated RF signal by delaying the phase of the original RF signal 510 by 90 degree.

Again, FIG. 4 will be described.

The processor 190 of the A/V transmitting device 100 assigns the same identifier to the original RF signal and one or more phase-modulated RF signals (S403).

The processor 190 may assign the same identifier to the original RF signal and the phase-modulated RF signal corresponding to the original RF signal for synchronization of the phase difference generated signal.

The identifier may be any one of number and letter, but need not be limited thereto, as long as RF signals transmitted sequentially can be identified from each other.

The processor 190 of the A/V transmitting device 100 compresses the original RF signal and one or more phase-modulated RF signals (S405).

The processor 190 of the A/V transmitting device 100 transmits an RF packet in which an original RF signal and one or more phase-modulated RF signals are compressed to the A/V receiving device 200 through the RF transmitting module 150 (S407).

The processor 190 may assign the same identifier as the original RF signal to the compressed RF packet.

The microcomputer 290 of the A/V receiving device 200 stores one or more phase-modulated RF signals included in the received RF packet in a buffer (S409).

The microcomputer 290 may extract one or more phase-modulated RF signals from the RF packet and temporarily store the extracted one or more phase-modulated RF signals in a buffer.

When the original RF signal is output through the display 260, the microcomputer 290 may delete one or more phase-modulated RF signals having the same identifier as the original RF signal from the buffer.

In another embodiment, the microcomputer 290 may delete one or more phase-modulated RF signals after a predetermined time. The predetermined time may be the time until the microcomputer 290 restores the original RF signal and outputs the restored original RF signal through the display 260.

That is, the predetermined time may be determined according to the signal processing speed of the microcomputer 290.

The buffer (not shown) may be provided in the memory 250 of the A/V receiving device 200 or may be included in the microcomputer 290.

A buffer may contain multiple address values. Each address value may correspond to an identifier, an original RF signal, and one or more phase-modulated RF signals.

The microcomputer 290 of the A/V receiving device 200 determines whether loss occurs in the original RF signal (S411).

The microcomputer 290 may determine whether loss occurs in the original RF signal based on the ID of the original RF signal included in the compressed RF packet.

When the ID is a number, the microcomputer 290 may determine that loss has occurred in the original RF signal when the number of sequentially received original RF signals is out of order.

For example, if 1 is assigned to the first original RF signal and 3 is assigned to the second original RF signal that follows the first original RF signal, the microcomputer 290 may determine that the original RF signal corresponding to 2 is lost.

When it is determined that the loss of the original RF signal has occurred, the microcomputer 290 of the A/V receiving device 200 restores one or more phase-modulated RF signals stored in the buffer (S413).

When it is determined that the loss of the original RF signal has occurred, the microcomputer 290 may restore the phase-modulated RF signal to which the same number as that of the original RF signal in which loss has occurred has been assigned.

When a plurality of phase-modulated RF signals are stored, the microcomputer 290 may extract a phase-modulated RF signal having the smallest phase difference from the original RF signal and restore the extracted signal.

The microcomputer 290 of the A/V receiving device 200 outputs the restored phase-modulated RF signal through the display 260 (S415).

Steps S411 to S415 will be described with reference to FIG. 6.

Figure 6:
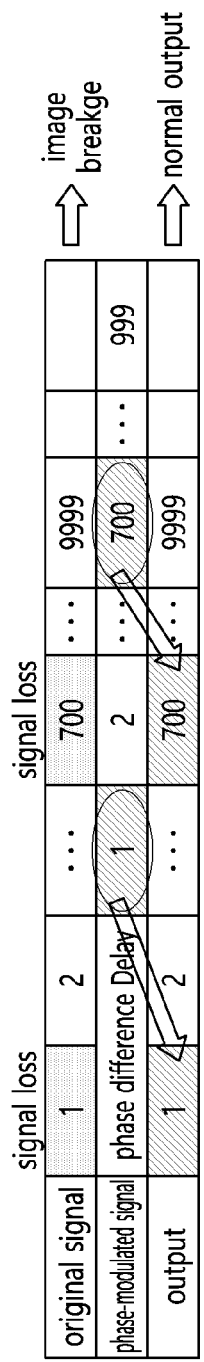
FIG. 6 is a diagram illustrating a process of outputting a phase-modulated RF signal corresponding to an original RF signal when the original RF signal is lost according to an embodiment of the present disclosure.

FIG. 6 is a diagram illustrating a process of outputting a phase-modulated RF signal corresponding to an original RF signal when the original RF signal is lost according to an embodiment of the present disclosure.

In FIG. 6, it is assumed that RF signals assigned from numbers 1 to 9999 are being transmitted from the A/V transmitting device 100 to the A/V receiving device 200.

When the original RF signal assigned number 700 is lost, image breakage may occur on the display 260.

The microcomputer 290 may extract a phase-modulated RF signal corresponding to the original RF signal No. 700 stored in the buffer, restore the extracted phase-modulated RF signal, and output the restored phase-modulated RF signal to the display 260.

That is, due to the phase-modulated RF signal that is the same as the original RF signal and has a different phase, the user can recognize that a normal image is being output. This is because, in general, RF signals are processed within 100 ms from reception to output.

When the original RF signal corresponding to number 700 is lost due to a temporary failure such as signal loss, the microcomputer 290 may change the output path to the address value corresponding to the backed-up phase modulated RF signal, and output the phase modulated RF signal.

Accordingly, even if a loss of the RF original signal occurs, from the user's point of view, it can be recognized that a normal image is being output.

Again, FIG. 4 will be described.

Meanwhile, when it is determined that the loss of the original RF signal does not occur, the microcomputer 290 of the A/V receiving device 200 outputs the restored original RF signal through the display 260 (S417).

When the loss of the original RF signal does not occur, the microcomputer 290 may restore the original RF signal and output the restored original RF signal to the display 260.

As described above, according to an embodiment of the present disclosure, backup data is provided through phase modulation of the original RF signal, and stable output of the RF signal can be achieved even if the original RF signal is lost.

Figure 7:
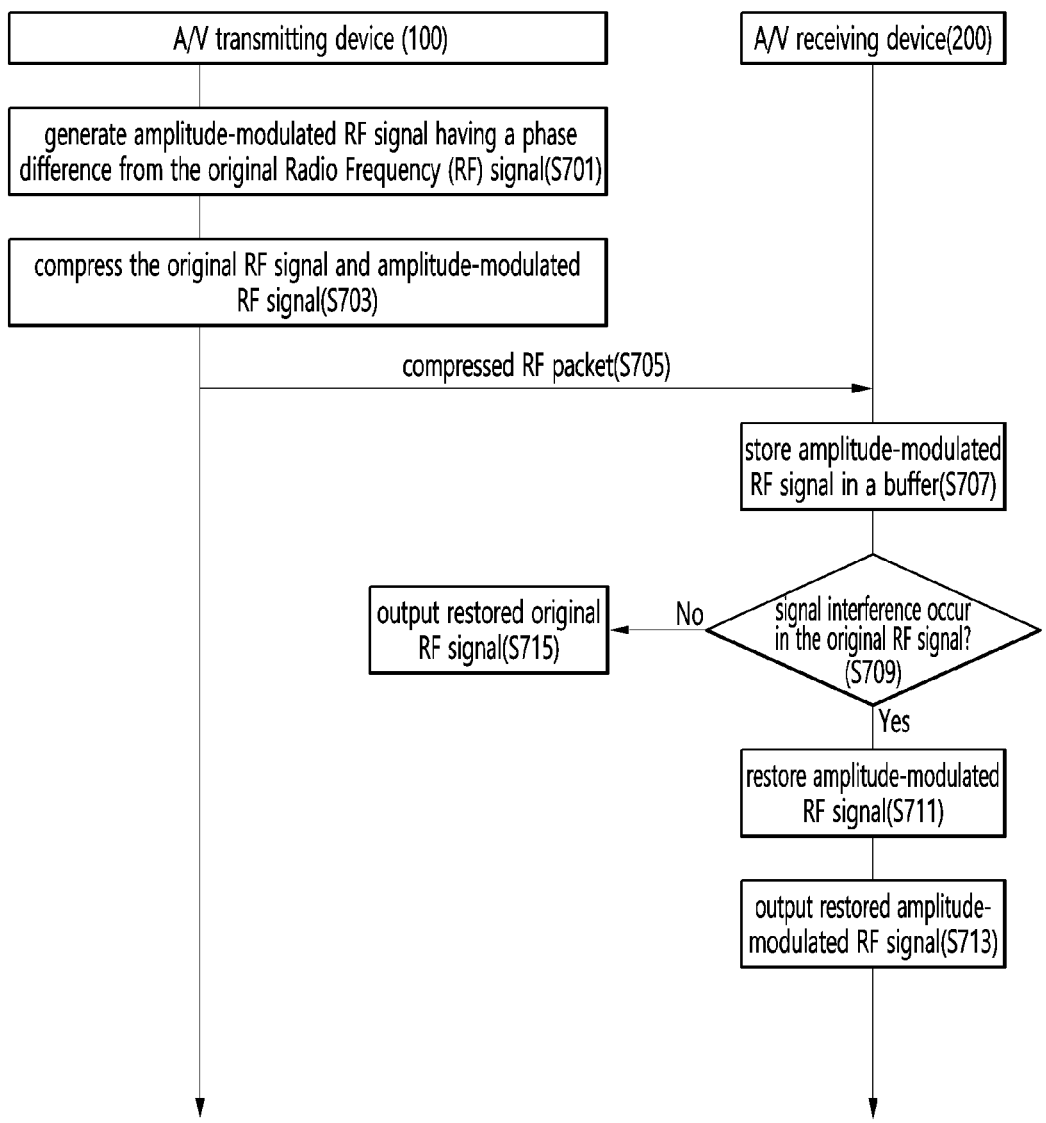
FIG. 7 is a ladder diagram for explaining a method of operating a wireless display system according to another embodiment of the present disclosure.

FIG. 7 is a ladder diagram for explaining a method of operating a wireless display system according to another embodiment of the present disclosure.

In particular, FIG. 7 is an embodiment for preventing interference of a transmission channel through amplitude modulation of an original RF signal.

The processor 190 of the A/V transmitting device 100 generates an amplitude modulated RF signal having an amplitude difference from the original radio frequency (RF) signal (S701).

The amplitude modulated RF signal may be a signal obtained by modulating a peak value of an original RF signal. The amplitude modulated RF signal may be a signal obtained by reducing a peak value of an original RF signal by a predetermined amplitude.

The amplitude modulated RF signal may be used to avoid the risk of blocking the corresponding frequency band when interference occurs in the frequency band of the original RF signal.

The frequency band of the amplitude-modulated RF signal may be smaller than the frequency band of the original RF signal by a predetermined amplitude.

Figure 8:
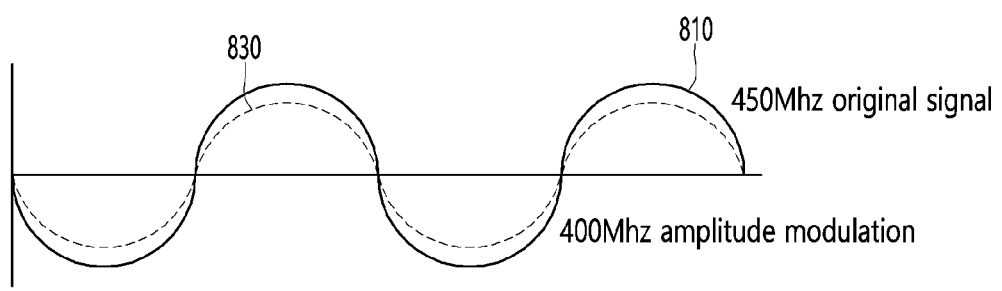
FIG. 8 is a diagram for explaining an amplitude modulated RF signal according to an embodiment of the present disclosure.

FIG. 8 is a diagram for explaining an amplitude modulated RF signal according to an embodiment of the present disclosure.

Referring to FIG. 8, an original RF signal 810 of a 450 MHz band is shown.

The processor 190 may reduce the peak value of the original RF signal 810 from the first value to the second value. The processor 190 may generate an amplitude modulated RF signal 830 by adjusting a peak value of the original RF signal 810. The amplitude-modulated RF signal 830 having a 400 MHz band may be obtained by adjusting the peak value of the original RF signal 810

That is, the processor 190 may generate an amplitude modulated RF signal 830 of the 400 MHz band by reducing the peak value of the original RF signal 810 of the 450 MHz band.

The processor 190 may generate an RF packet including the original RF signal 810 of the 450 MHz band and the amplitude modulated RF signal 830 of the 400 MHz band.

Again, FIG. 7 will be described.

The processor 190 of the A/V transmitting device 100 compresses the original RF signal and the amplitude-modulated RF signal (S703).

The processor 190 may compress the original RF signal and the amplitude modulated RF signal to generate a compressed RF packet.

The processor 190 of the A/V transmitting device 100 transmits an RF packet in which the original RF signal and the amplitude-modulated RF signal are compressed to the A/V receiving device 200 through the RF transmitting module 150 (S705).

The microcomputer 290 of the A/V receiving device 200 stores the amplitude-modulated RF signal included in the received RF packet in a buffer (S707).

The microcomputer 290 of the A/V receiving device 200 determines whether signal interference has occurred based on the original RF signal (S709).

In one embodiment, the microcomputer 290 may determine that signal interference has occurred periodically when image breakage occurs.

Specifically, the microcomputer 290 may determine that signal interference has occurred when a part of the sequentially received original RF signal is periodically lost.

When it is determined that signal interference has occurred, the microcomputer 290 of the A/V receiving device 200 restores the amplitude-modulated RF signal stored in the buffer (S711), and outputs the restored amplitude-modulated RF signal on the display 260 (S713).

When it is determined that signal interference has occurred, the microcomputer 290 may extract an amplitude modulated RF signal corresponding to the original RF signal from the RF packet and output the extracted amplitude modulated RF signal through the display 260.

Figure 9:
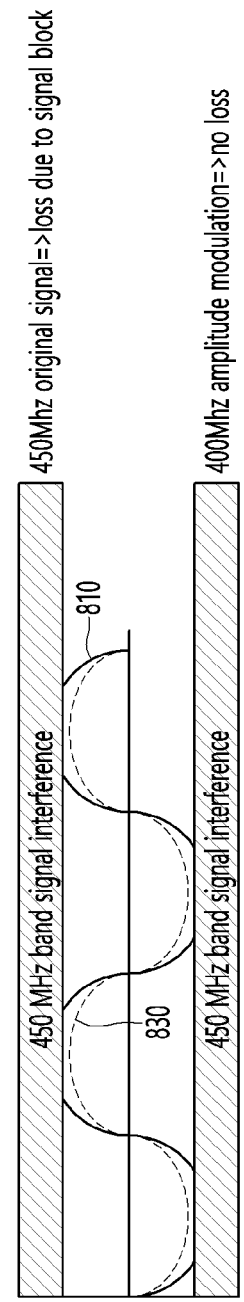
FIG. 9 is a diagram for explaining a process of outputting an amplitude-modulated RF signal corresponding to an original RF signal when a part of the original RF signal is lost due to signal interference according to an embodiment of the present disclosure.

FIG. 9 is a diagram for explaining a process of outputting an amplitude-modulated RF signal corresponding to an original RF signal when a part of the original RF signal is lost due to signal interference according to an embodiment of the present disclosure.

Partial loss of the original RF signal can be synonymous with signal interference.

Referring to FIG. 9, an original RF signal 810 of a 450 MHz band is shown. If signal interference occurs, a part of the original RF signal 810 may be periodically blocked.

When a part of the original RF signal 810 is periodically blocked, the microcomputer 290 of the A/V receiving device 200 may convert the original RF signal 810 into an amplitude modulated RF signal 830 of the 400 MHz band.

That is, when a signal of the 450 MHz band is periodically blocked, the microcomputer 290 may convert the original RF signal 810 into an amplitude modulated RF signal 830 and output the same.

Accordingly, signal interference is avoided, and the image may be output through the display 260 without being broken.

Again, FIG. 7 will be described.

Meanwhile, the microcomputer 290 of the A/V receiving device 200 outputs the restored original RF signal to the display 260 when signal interference does not occur (S715).

Figure 10:
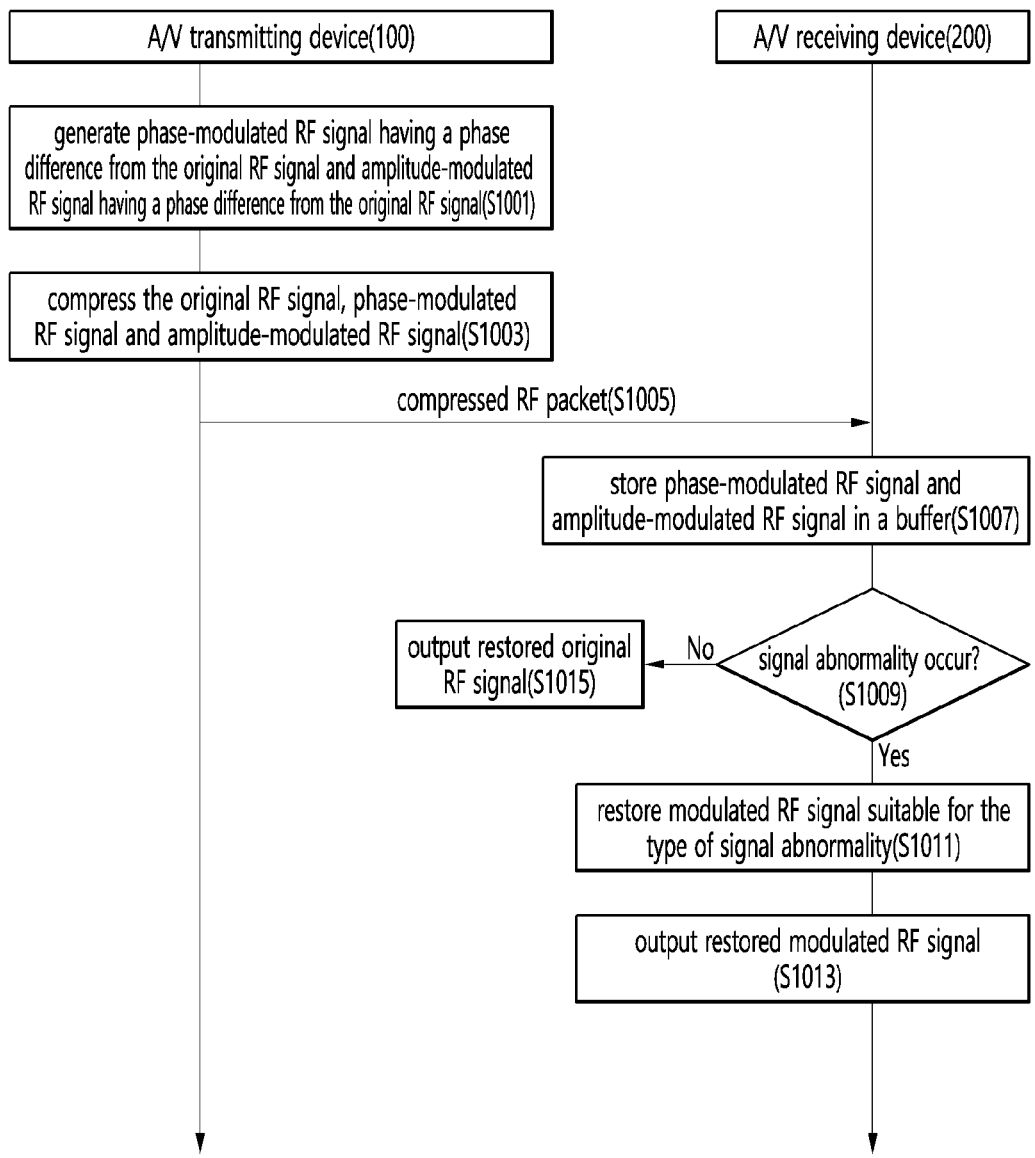
FIG. 10 is a ladder diagram illustrating an operating method of a wireless display system according to another embodiment of the present disclosure.

FIG. 10 is a ladder diagram illustrating an operating method of a wireless display system according to another embodiment of the present disclosure.

In particular, FIG. 10 is a diagram for explaining an embodiment in which the A/V transmitting device 100 transmits an original RF signal, a phase-modulated RF signal, and an amplitude-modulated RF signal together to the A/V receiving device 200.

Referring to FIG. 10, the processor 190 of the A/V transmitting device 100 generates a phase-modulated RF signal based on a phase difference from the original Radio Frequency (RF) signal and an amplitude-modulated RF signal having an amplitude difference from the original RF signal (S1001).

The processor 190 may generate a phase modulated RF signal having a phase difference from the original RF signal and an amplitude modulated RF signal having an amplitude difference from the original RF signal to avoid loss and interference of the original RF signal.

The phase difference may be any one of 90 degree, 180 degree, and 270 degree.

The amplitude difference can be in the range of 15-20% of the peak value of the original RF signal.

Processor 190 may generate one or more phase modulated RF signals.

The embodiment of FIG. 5 for generating a phase-modulated RF signal and the embodiment of FIG. 8 for generating an amplitude-modulated RF signal may be applied.

The processor 190 of the A/V transmitting device 100 compresses the original RF signal, the phase-modulated RF signal, and the amplitude-modulated RF signal (S1003).

An encoder included in the processor 190 may compress the original RF signal, the phase modulated RF signal, and the amplitude modulated RF signal. The encoder may compress the original RF signal, the phase-modulated RF signal, and the amplitude-modulated RF signal while giving the same identifier.

The encoder may generate an RF packet in which the original RF signal, the phase-modulated RF signal, and the amplitude-modulated RF signal are compressed.

The processor 190 of the A/V transmitting device 100 transmits RF packets in which the original RF signal, the phase-modulated RF signal, and the amplitude-modulated RF signal are compressed through the RF transmitting module 150 to the A/V receiving device 200 (S1005).

The microcomputer 290 of the A/V receiving device 200 stores the phase-modulated RF signal and the amplitude-modulated RF signal included in the received RF packet in a buffer (S1007).

The microcomputer 290 of the A/V receiving device 200 determines whether an abnormality has occurred in the original RF signal (S1009).

The microcomputer 290 may determine the type of signal abnormality based on the original RF signal.

The type of signal abnormality can be either signal loss or signal interference.

When the number of the original RF signal is missing, the microcomputer 290 may determine the type of signal error as signal loss.

When a part of the original RF signal is periodically lost, the microcomputer 290 may determine the type of signal abnormality as signal interference.

When it is determined that an abnormality has occurred in the original RF signal, the microcomputer 290 of the A/V receiving device 200 restores a modulated RF signal suitable for the type of signal abnormality (S1011).

The microcomputer 290 may restore the phase-modulated RF signal when the type of signal abnormality is signal loss. The microcomputer 290 may output the restored phase-modulated RF signal instead of the lost original RF signal.

The microcomputer 290 may restore the amplitude-modulated RF signal when the type of signal abnormality is signal interference. The microcomputer 290 may convert the existing original RF signal into a restored amplitude modulated RF signal and output the converted amplitude modulated RF signal.

The microcomputer 290 of the A/V receiving device 200 outputs the restored modulated RF signal through the display 260 (S1013).

When it is determined that there is no abnormality in the original RF signal, the microcomputer 290 of the A/V receiving device 200 outputs the restored original RF signal through the display 260 (S1015).

As described above, according to an embodiment of the present disclosure, even if loss or interference of an original signal occurs, stable image output can be achieved through the phase-modulated RF signal and the amplitude-modulated RF signal transmitted as a backup.

Accordingly, the user may not feel inconvenience in viewing the video even in a situation where the network transmission environment is not good.

Figure 11:
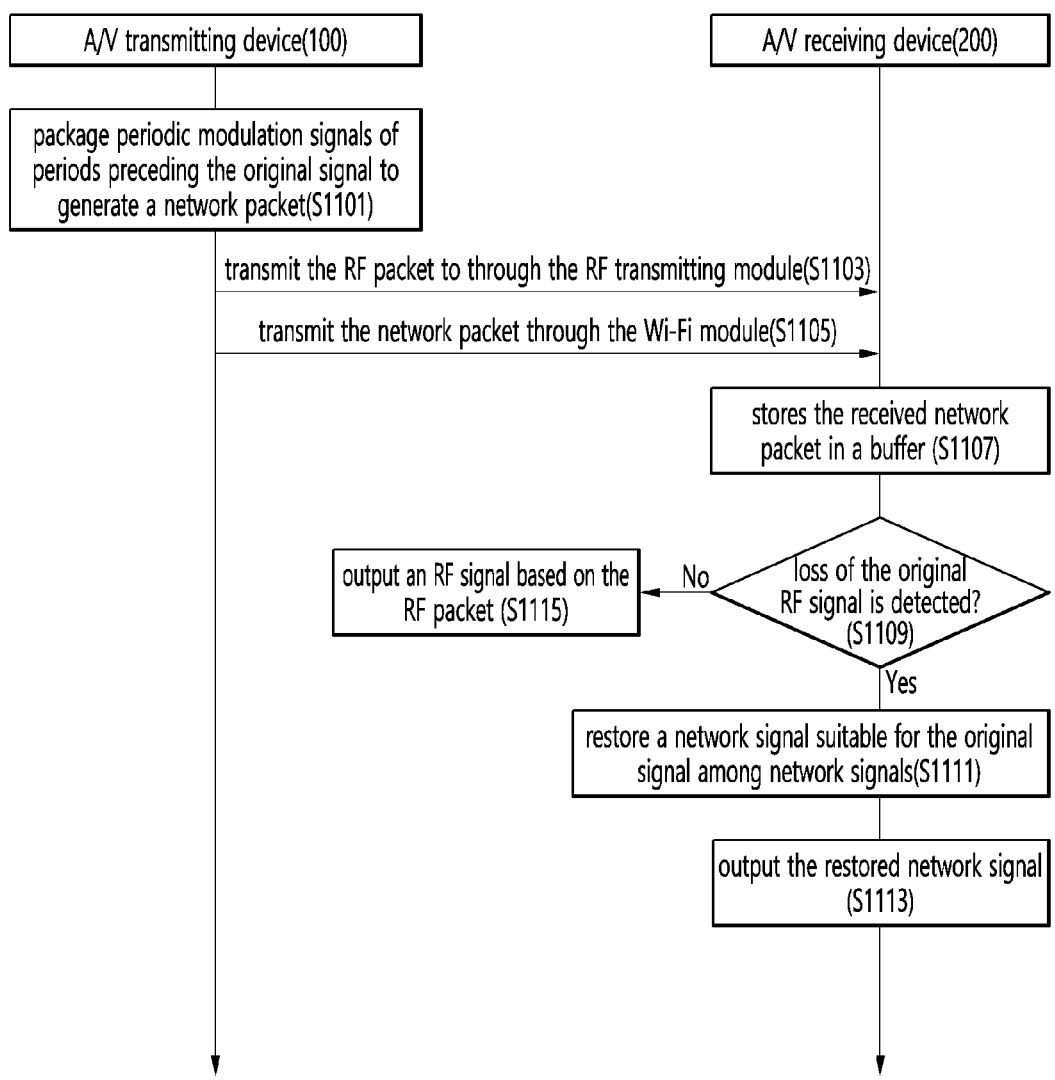
FIG. 11 is a ladder diagram for explaining a method of operating a wireless display system according to another embodiment of the present disclosure.

FIG. 11 is a ladder diagram for explaining a method of operating a wireless display system according to another embodiment of the present disclosure.

In particular, FIG. 11 is an embodiment of a method for overcoming the limitation of RF communication apart from the RF communication discussed above.

RF communication has directionality by nature, and reception sensitivity is reduced due to obstacle around the transceiver. Because of this, the transmitter and receiver must protrude, which is a condition of design and location constraint.

In an embodiment of the present disclosure, in order to overcome the limitations of RF communication, it is intended to transmit a backup A/V signal using a Wi-Fi communication standard according to a network environment.

Referring to FIG. 11, the processor 190 of the A/V transmitting device 100 packages periodic modulation signals of periods preceding the original signal to generate a network packet (S1101).

The original signal may include one or more of an RF video signal or an RF audio signal transmitted through RF communication.

In the embodiment of FIG. 11, it is assumed that the original signal is a video signal.

The network packet may be a packet transmitted to the A/V receiving device 200 through a Wi-Fi communication standard.

The processor 190 may generate a network packet by packaging a first network signal transmitted 1 cycle ahead of the original signal, a second network signal transmitted 2 cycles ahead of the original signal, and a third network signal identical to the original signal.

However, this is just an example, and the processor 190 may generate more phase modulated signals of earlier cycle.

The same identifier may be assigned to each of the original RF signal, the first network signal, the second network signal, and the third network signal.

The processor 190 may package the phase modulated signals according to the Wi-Fi communication standard.

The reason for packaging two or more phase modulated signals is to prevent signal loss by utilizing the phase modulated signals included in the following packets when a network packet transmitted through Wi-Fi communication is damaged.

This will be described in detail later.

The processor 190 of the A/V transmitting device 100 transmits the RF packet to the RF receiving module 240 of the A/V receiving device 200 through the RF transmitting module 150 (S1103).

An RF packet may contain an original RF signal. The RF packet may further include one or more of a phase modulated RF signal and an amplitude modulated RF signal.

The RF packet may be a packet transmitted to the A/V receiving device 200 in a preset frequency band through RF communication.

At the same time, the processor 190 of the A/V transmitting device 100 transmits the network packet to the Wi-Fi module 210 of the A/V receiving device 200 through the Wi-Fi module 120 (S1105).

The network packet may be a packet to replace the original RF signal when the original RF signal transmitted through RF communication is lost.

The processor 190 may transmit the network packet to the A/V receiving device 200 at the same timing as the transmission time of the RF packet.

The microcomputer 290 of the A/V receiving device 200 stores the received network packet in a buffer (S1107).

The microcomputer 290 of the A/V receiving device 200 determines whether loss of the original RF signal is detected based on the RF packet (S1109).

In one embodiment, the microcomputer 290 may determine that the original RF signal is lost when the original RF signal is missing.

When the loss of the original RF signal is detected, the microcomputer 290 of the A/V receiving device 200 extracts a network signal suitable for the original signal among network signals included in the network packet, and restores the extracted network signal (S1111).

When loss of the original RF signal is detected, the microcomputer 290 may extract a network signal having the same identifier as the original RF signal from among network signals included in the network packet.

That is, the microcomputer 290 may extract a network signal to which the same number as the original RF signal is assigned.

On the other hand, if the same network signal as the original RF signal does not exist in the network packet received at the same timing as the RF packet, the microcomputer 290 may extract the same network signal as the original RF signal using the network packet received in the next cycle.

FIG. 12 is a diagram for explaining a process of compensating for an original signal using a network packet when loss of an original signal occurs according to an embodiment of the present disclosure.

Referring to FIG. 12, original signals are sequentially numbered from 1 to 10.

A network packet may contain one or more network signals. Each network signal is also assigned a number.

An original signal and a network signal to which the same number is assigned may be the same signal.

At least two network packets may be stored in the buffer of the A/V receiving device 200.

The original signal is received through RF communication, and one network packet may be received through Wi-Fi communication at the same timing as the original signal.

When the loss of the original signal No. 3 occurs, the A/V receiving device 200 may extract a network signal assigned NO. 3 from the network packet (including network signals No. 1, 2, and 3) received at the same timing as the original signal at which the loss occurred.

The A/V receiving device 200 may output the extracted network signal of NO. 3 through the display 260.

An original signal and a network packet received at the same timing as the original signal may be lost.

When the A/V receiving device 200 detects the loss of the original signal assigned NO. 5 and the network packet assigned number 5, may extract a network signal assigned NO. 5 from network packet (network including signals of NO. 4, 5, and 6) of the NO. 6 following NO. 5.

The A/V receiving device 200 may output the extracted network signal to which No. 5 is assigned to the display 260.

Again, FIG. 11 will be described.

The microcomputer 290 of the A/V receiving device 200 outputs the restored network signal through the display 260 (S1113).

The microcomputer 290 of the A/V receiving device 200 outputs an RF signal based on the RF packet through the display 260 when the reception sensitivity deterioration state is not detected (S1115).

As such, according to an embodiment of the present disclosure, when a failure of the original RF signal occurs, deterioration of the image can be prevented by outputting the network signal stored in the buffer.

On the other hand, in the case of the Wi-Fi communication standard, since the size unit of a network packet is large, a delay may occur for a video output command for the user's remote control device 200. To this end, A/V signal transmission through the Wi-Fi communication standard may be selectively implemented and may vary according to user settings on the UI.

Meanwhile, according to an embodiment of the present disclosure, encryption data may be added to network packets transmitted through Wi-Fi communication. In this case, the network packet can be decoded only by the A/V receiving device 200 allowed by the A/V transmitting device 100.

When encrypted data is added to a network packet, one A/V transmitting device 100 can perform 1:N communication between a plurality of A/V receiving devices. Due to 1:N communication, scalability of data transmission is increased.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The A/V transmitting device described above is not limited to the configuration and method of the above-described embodiments, but all or part of each embodiment is selectively combined so that various modifications can be made.

What is claimed is:

1. An A/V (Audio/Video) receiving device, comprising:
a display;
a RF receiving module configured to receive a Radio Frequency (RF) packet from an A/V transmitting device; and
a microcomputer configured to:
when an abnormality occurs in an original RF signal included in the received RF packet, obtain a backup signal included in the RF packet and having the same identifier as the original RF signal,
restore the obtained backup signal, and
output the backup signal to the display.

2. The A/V receiving device of claim 1, wherein the backup signal is a phase-modulated RF signal having a predetermined phase difference from the original RF signal.

3. The A/V receiving device of claim 2, wherein the microcomputer is further configured to output the phase-modulated RF signal to the display instead of the original RF signal when loss of the original RF signal occurs.

4. The A/V receiving device of claim 1, wherein the backup signal is an amplitude-modulated RF signal having an amplitude smaller than an amplitude of the original RF signal by a certain magnitude.

5. The A/V receiving device of claim 4, wherein the microcomputer is further configured to output the amplitude modulated RF signal to the display instead of the original RF signal when interference of the original RF signal occurs.

6. The A/V receiving device of claim 1, wherein the backup signal is a phase-modulated RF signal having a predetermined phase difference from the original RF signal and an amplitude-modulated RF signal having an amplitude smaller than that of the original RF signal by a predetermined magnitude;
wherein the microcomputer is further configured to output one of the phase-modulated RF signal and the amplitude-modulated RF signal to the display according to an abnormality type of the original RF signal.

7. The A/V receiving device of claim 6, wherein the microcomputer is configured to:
output the phase-modulated RF signal to the display, when loss of the original RF signal occurs,
output the amplitude modulated RF signal to the display when periodic breakage occurs in the original RF signal.

8. The A/V receiving device of claim 1, further comprising a Wi-Fi module configured to receive a network packet at the same timing as the RF packet from the A/V transmitting device through a Wi-Fi communication,
the network packet includes a network signal assigned the same identifier as the original RF signal and a plurality of network signals having a cycle earlier than that of the original RF signal,
wherein the microcomputer is further configured to:
output a network signal assigned the same identifier as the original RF signal to the display when loss of the original RF signal occurs.

9. The A/V receiving device of claim 8, wherein the microcomputer is configured to
output a network signal assigned the same identifier as the original RF signal included in a network packet following the network packet to the display when the received network packet is lost at the same timing as the RF packet.

10. A wireless display system, comprising:
an A/V (Audio/Video) transmitting device configured to:
generate an RF packet and transmit the generated RF packet to an A/V receiving device through RF communication; and
an A/V receiving device configured to:
receive the RF packet from the A/V transmitting device,
when an abnormality occurs in an original RF signal included in the received RF packet, obtain a backup signal included in the RF packet and having the same identifier as the original RF signal,
restore the obtained backup signal, and
output the backup signal.

11. The wireless display system of claim 10, wherein the backup signal is a phase-modulated RF signal having a predetermined phase difference from the original RF signal.

12. The wireless display system of claim 11, wherein the A/V receiving device is further configured to output the phase-modulated RF signal to the display instead of the original RF signal when loss of the original RF signal occurs.

13. The wireless display system of claim 11, wherein the backup signal is an amplitude-modulated RF signal having an amplitude smaller than an amplitude of the original RF signal by a certain magnitude.

14. The wireless display system of claim 13, wherein the A/V receiving device is further configured to output the amplitude modulated RF signal to the display instead of the original RF signal when interference of the original RF signal occurs.

15. The wireless display system of claim 10, wherein the A/V transmitting device is further configured to transmit a network packet to the A/V receiving device at the same timing as the RF packet through Wi-Fi communication,
Wherein the network packet includes a network signal assigned the same identifier as the original RF signal and a plurality of network signals having a cycle earlier than that of the original RF signal,
wherein the m A/V receiving device is further configured to:
output a network signal assigned the same identifier as the original RF signal to the display when loss of the original RF signal occurs.

* * * * *